Patented July 16, 1946

2,403,940

UNITED STATES PATENT OFFICE 2,403,940

PRODUCTION OF MAGNESIUM THIOSULPHATE AND MAGNESIUM OXIDE FROM DOLOMITE

Walter H. MacIntire, Knoxville, Tenn., assignor to American Zinc, Lead & Smelting Company, St. Louis, Mo., a corporation of Maine No Drawing. Application January 19, 1945, Serial No. 573,624

4 Claims. (Cl. 23—115)

This invention relates to the production of magnesium thiosulphate and/or magnesium oxide from dolomitic materials, and also to the recovery of the calcic components of such materials in a novel and useful form.

Magnesium thiosulphate is analogous in constitution and properties to the more widely known and used sodium thiosulphate. The magnesium salt has medicinal properties and may also be used in photography analogously as the sodium salt. When magnesium oxide of high purity is desired, moreover, calcination of magnesium thiosulphate produces the oxide in a virtually chemically pure state.

The present invention comprises a simple, economical and efficient process for the treatment of dolomite with resultant production of magnesium thiosulphate which can be used as such or calcined to provide magnesia of high purity. At the same time the calcic components of the dolomite are recovered in the form of a precipitated mixture of sulphur and calcium carbonate useful as an insecticide, fungicide, etc.

In carrying out the process, dolomite is first calcined to form lime (CaO) and magnesia (MgO). The calcine is then suspended in 12 to 15 parts of water, together with elemental sulphur preferably in the proportion of about 12 mols of sulphur to 3 mols of CaO. This suspension is then heated to cause a reaction between the sulphur and lime, being for example boiled for 30–45 minutes. The reaction, which is known per se, takes place as follows:

$$3Ca(OH)_2 + 12S = 2CaS_5 + CaS_2O_3 + 3H_2O$$

The magnesic components are not affected by the reaction, which results in a suspension of MgO and Mg(OH)$_2$ in an aqueous solution of calcium pentasulphide (CaS$_5$) and calcium thiosulphate (CaS$_2$O$_3$).

The suspension-solution is then preferably cooled to about room temperature and gassed with sulphur dioxide until it is just slightly acidic. This converts the calcium pentasulphide to calcium thiosulphate, with liberation of about three-fourths of the starting sulphur, the remaining one-fourth being in the form of the thiosulphate.

The suspension-solution is then gassed with carbon dioxide which displaces the thiosulphate and combines with the calcium in the form of a pulverulent calcium carbonate, the latter being precipitated but remaining in suspension in intimate association with three-fourths of the starting sulphur already in suspension. At the same time the thiosulphate combines with the suspended magnesium and brings it into solution in the form of magnesium thiosulphate (MgS$_2$O$_3$). The addition of carbon dioxide is preferably made at 3–6 atmospheres pressure and continued until equilibrium is attained.

Filtration of the suspension-solution removes an intimate mixture of precipitated sulphur and precipitated calcium carbonate which is useful as an insecticide and particularly as a fungicide. The remaining solution can then be treated in any desired way to recover the magnesium thiosulphate, as by evaporation to produce crystalline MgS$_2$O$_3$.6H$_2$O.

The magnesium thiosulphate can be used as such for any desired purpose such as those mentioned above, or it can be calcined to provide a virtually chemically pure magnesium oxide. In the latter case the sulphur dioxide liberated is preferably recovered and recycled for use in treating the suspension-solution as described above.

It will be understood that the details of procedure given above are by way of example only and that reference should be had to the appended claims for a definition of the limits of the invention.

What is claimed is:

1. A process of treating dolomite which comprises calcining the dolomite to form magnesium and calcium oxides, suspending the calcine in water together with sulphur and heating the suspension to form a solution of calcium pentasulphide, injecting sulphur dioxide into the suspension-solution to convert the pentasulphide into calcium thiosulphate, then treating the suspension-solution with carbon dioxide forming precipitated calcium carbonate in suspension in a solution of magnesium thiosulphate, separating the undissolved material from the solution, and recovering the magnesium thiosulphate.

2. A process of treating dolomite which comprises calcining the dolomite to form magnesium and calcium oxides, suspending the calcine in water together with sulphur and heating the suspension to form a solution of calcium pentasulphide, injecting sulphur dioxide into the suspension-solution to convert the pentasulphide into calcium thiosulphate, then treating the suspension-solution with carbon dioxide forming precipitated calcium carbonate in suspension in a solution of magnesium thiosulphate, separating the undissolved material from the solution, and recovering and calcining the magnesium thiosulphate to magnesium oxide.

3. A process of treating dolomite which comprises calcining the dolomite to form magnesium and calcium oxides, suspending the calcine in water together with sulphur and heating the suspension to form a solution of calcium pentasulphide, injecting sulphur dioxide into the suspension-solution to convert the pentasulphide into calcium thiosulphate, then treating the suspension-solution with carbon dioxide forming precipitated calcium carbonate in suspension in a solution of magnesium thiosulphate, separating the undissolved material from the solution, and recovering and calcining the magnesium thiosulphate to magnesium oxide, sulphur dioxide being liberated by calcination and recycled to the suspension-solution.

4. A process of treating dolomite which comprises calcining the dolomite to form magnesium and calcium oxides, suspending the calcine in water together with sulphur and heating the suspension to form a solution of calcium pentasulphide, injecting sulphur dioxide into the suspension-solution to convert the pentasulphide into calcium thiosulphate with precipitation of sulphur, treating the suspension-solution with carbon dioxide forming precipitated calcium carbonate in suspension with said sulphur in a solution of magnesium thiosulphate, separating from the solution and recovering a mixture of sulphur and calcium carbonate, and recovering the magnesium thiosulphate from the solution.

WALTER H. MacINTIRE.